(No Model.)
J. COLLINS.
Faucet for Dispensing Mineral Waters.
No. 232,003. Patented Sept. 7, 1880.
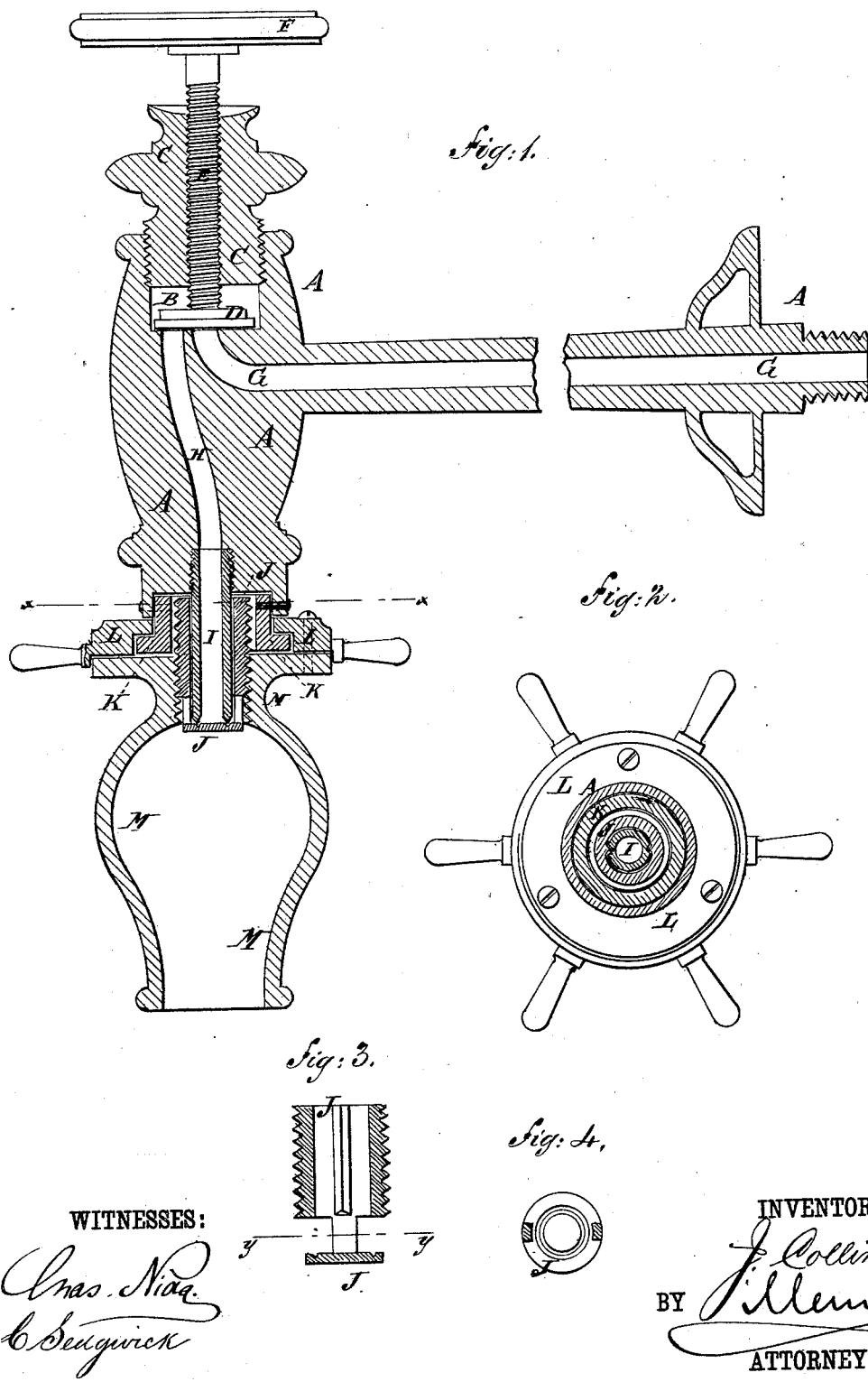

UNITED STATES PATENT OFFICE.

JOHN COLLINS, OF BROOKLYN, NEW YORK.

FAUCET FOR DISPENSING MINERAL WATERS.

SPECIFICATION forming part of Letters Patent No. 232,003, dated September 7, 1880.

Application filed June 29, 1880. (No model.)

*To all whom it may concern:*

Be it known that I, JOHN COLLINS, of Brooklyn, in the county of Kings and State of New York, have invented a new and useful Improvement in Double-Valved Faucets for Mineral-Water Fountains, of which the following is a specification.

Figure 1 is a sectional side elevation of the improvement. Fig. 2 is a cross-section taken through the line $x\,x$, Fig. 1. Fig. 3 is a longitudinal section of the lower valve. Fig. 4 is a cross-section of the lower valve, taken through the line $y\,y$, Fig. 3.

Similar letters of reference indicate corresponding parts.

The object of this invention is to furnish faucets for mineral-water fountains, so constructed that the water can be introduced into the glasses without losing its sparkle, and which will not be liable to leak or get out of order.

The invention consists in constructing a double-valved faucet for mineral-water fountains of the body having a cavity in its upper end and two passages, the screw-plug, the upper screw-valve, the lower screw-valve, formed of the stationary tube, the sliding tube having closed lower end, openings in the sides of its lower part, and a screw-thread upon its outer surface, the stationary flanged tube to form a seat for the hand-wheel, and the hand-wheel carrying the nozzle, as will be hereinafter fully described.

A represents the body of the faucet, the stem of which is secured to the fountain in the usual manner. In the upper part of the body A is formed a cavity, B, which is closed by a screw-plug, C, and the bottom of which serves as a seat for the valve D. The stem E of the valve D has a screw-thread formed upon it, passes through a screw-hole in the plug C, and has a hand-wheel, F, attached to its upper end. The passage G through the stem of the faucet A terminates at the bottom of the cavity B, so as to be closed by the valve D. The valve D also closes the upper end of the passage H that passes down through the body A of the faucet, and is continued through the tube I, which is screwed into or otherwise rigidly attached to the said body A. The lower end of the tube I may be beveled upon one or both sides to cause it to fit closer upon its seat in the closed lower end of the tube J, which has the lower part of its sides cut away to form openings for the escape of the water when the said tube is run down. Upon the inner surface of the tube J are formed one or more longitudinal ribs, to enter longitudinal grooves in the outer surface of the tube I to prevent the tube J from turning upon the said tube I. The lower end of the body A is countersunk to receive the upper end of the tube J, and of a short tube, K, placed upon the upper part of the said tube J, and which is rigidly connected with the body A by pins or screws, as shown in Fig. 1. Around the lower end of the tube K is formed a ring-flange to serve as a seat for the hand-wheel, L, the inner surface of which is rabbeted to receive and fit upon the said flange.

To the hand-wheel L is secured the base of the nozzle M by rivets, bolts, or other suitable means. The cavity of the nozzle M is made pear-shaped, and in the inner surface of the passage, through its base, is formed a screw-thread to fit upon the screw-thread of the valve-tube J. With this construction the nozzle M will be turned by and with the hand-wheel L, so as to run the tube J down from the tube I to open the valve, and to run it up against the tube I to close the valve.

Having thus described my invention, what I claim as new, and desire to secure by Letters Patent, is—

1. A double-valved faucet for mineral-water fountains, constructed substantially as herein shown and described, consisting of the body A, having cavity B and passages G H, the screw-plug C, the valve D E, the stationary tube I, the sliding tube J, having a closed lower end, openings in the sides of its lower part, and a screw-thread upon its outer surface, the stationary flanged tube K, the hand-wheel L, and the nozzle M, as set forth.

2. In a double-valved faucet for mineral-water fountains, the combination, with the body A, provided with the passages G H and the tubes I K, of the sliding tube J, the hand-wheel L, and the nozzle M, substantially as and for the purpose set forth.

JOHN COLLINS.

Witnesses:
JAMES T. GRAHAM,
C. SEDGWICK.